(12) United States Patent
Sutton et al.

(10) Patent No.: US 8,308,058 B2
(45) Date of Patent: Nov. 13, 2012

(54) MOBILE BANKING ARCHITECTURE

(75) Inventors: Raphael Sutton, San Leandro, CA (US);
Dilip Sarmah, Fremont, CA (US);
Mark Theiding, Alameda, CA (US)

(73) Assignee: Sybase, Inc., Dublin, CA (US)

( * ) Notice: Subject to any disclaimer, the term of this patent is extended or adjusted under 35 U.S.C. 154(b) by 389 days.

(21) Appl. No.: 12/183,377

(22) Filed: Jul. 31, 2008

(65) Prior Publication Data

US 2010/0025460 A1 Feb. 4, 2010

(51) Int. Cl.
*G06K 5/00* (2006.01)

(52) U.S. Cl. .......... 235/380; 235/375; 235/487

(58) Field of Classification Search .......... 235/380, 235/375, 492, 451, 487
See application file for complete search history.

(56) References Cited

U.S. PATENT DOCUMENTS

| | | | |
|---|---|---|---|
| 7,082,312 B2 | 7/2006 | Zhang et al. | |
| 7,337,229 B2 | 2/2008 | Dutta et al. | |
| 2004/0030658 A1* | 2/2004 | Cruz | 705/65 |
| 2004/0160957 A1* | 8/2004 | Coffman | 370/394 |
| 2004/0181467 A1* | 9/2004 | Raiyani et al. | 705/28 |
| 2004/0267665 A1 | 12/2004 | Nam et al. | |
| 2005/0184164 A1* | 8/2005 | de Jong | 235/492 |
| 2005/0185661 A1 | 8/2005 | Scott et al. | |
| 2005/0246253 A1 | 11/2005 | Barthelemy | |
| 2006/0165060 A1 | 7/2006 | Dua | |
| 2007/0106564 A1 | 5/2007 | Matotek et al. | |
| 2007/0152058 A1* | 7/2007 | Yeakley et al. | 235/462.01 |
| 2007/0167178 A1 | 7/2007 | Al-Harbi | |
| 2007/0203836 A1 | 8/2007 | Dodin | |
| 2007/0244811 A1 | 10/2007 | Tumminaro | |
| 2008/0027844 A1 | 1/2008 | Little et al. | |
| 2008/0201225 A1* | 8/2008 | Maharajh et al. | 705/14 |
| 2009/0248582 A1 | 10/2009 | Barthelemy | |
| 2010/0029306 A1 | 2/2010 | Sarmah et al. | |

FOREIGN PATENT DOCUMENTS

| | | |
|---|---|---|
| CN | 1444370 A | 9/2003 |
| CN | 1625888 A | 6/2005 |
| KR | 10-2003-0090435 A | 11/2003 |
| WO | WO 02/21416 A1 | 3/2002 |

OTHER PUBLICATIONS

International Search Report and Written Opinion, mailed Mar. 10, 2010, for PCT Appl. No. PCT/US2009/004178, filed Jul. 20, 2009, 11 pages.
International Search Report and Written Opinion, mailed Mar. 16, 2010, for PCT Appl. No. PCT/US2009/004180, filed Jul. 20, 2009, 11 pages.
English Abstract for KR 10-2003-0090435, published Nov. 27, 2003, from espacenet.com, 1 page.
Office Communication, dated Sep. 2, 2011, for U.S. Appl. No. 12/183,390, filed Jul. 31, 2008, 19 pages.

(Continued)

*Primary Examiner* — Edwyn Labaze
(74) *Attorney, Agent, or Firm* — Sterne, Kessler, Goldstein & Fox PLLC

(57) ABSTRACT

A system, method, and computer program product are provided for interfacing a user device to a transaction system. An interface is provided in order to call a function on the transaction system for performing the transaction.

31 Claims, 14 Drawing Sheets

OTHER PUBLICATIONS

Extended European Search Report for EP Application No. EP 09 80 3230, The Hague, Netherlands, mailed May 7, 2012.

English language Translation of First Office Action issued on Apr. 12, 2012, in CN Application No. 200980138557.9, filed Jul. 20, 2009.

English language Abstract of Chinese Patent Publication No. CN1444370 A, European Patent Office, espacenet database—Worldwide (2003) (listed as document FP3 on the accompanying form PTO/SB/08a).

* cited by examiner

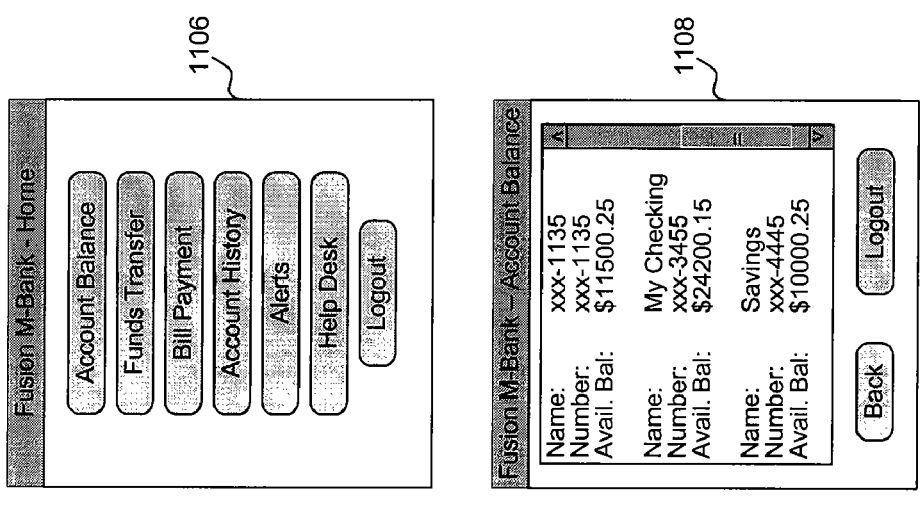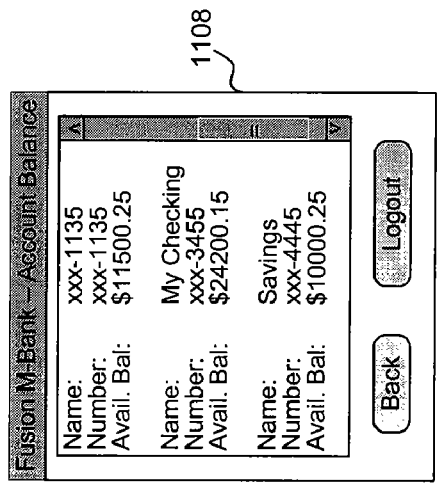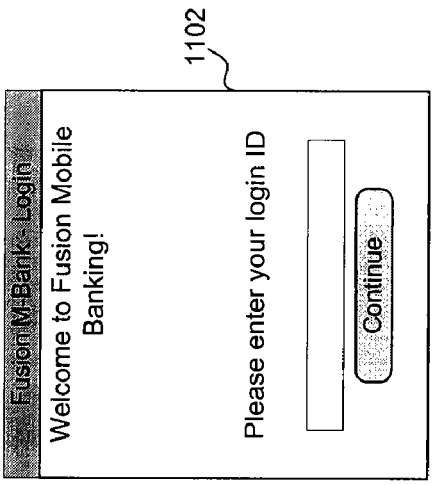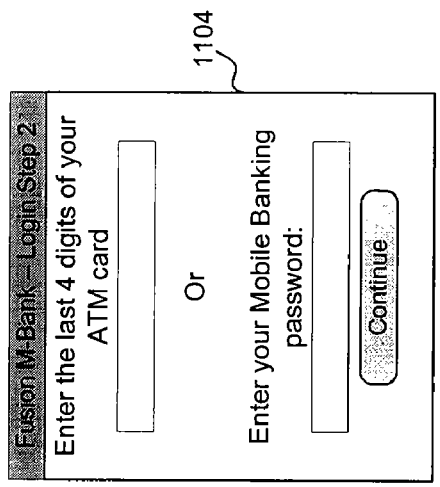
FIG. 11

MOBILE BANKING ARCHITECTURE

RELATED APPLICATIONS

The present application is related to commonly-owned U.S. patent application Ser. No. 12/183,390, filed Jul. 31, 2008, entitled MOBILE BANKING WITH SHORT MESSAGE SERVICE, which is hereby incorporated by reference in its entirety.

BACKGROUND OF INVENTION

1. Field of the Invention

The present invention relates generally to an interface for a transaction system and, more specifically, to a mobile banking architecture.

2. Description of the Background Art

With the prevalence of wireless data service over cellular phones, many business operations have facilitated access to their online services by providing their own services specifically tailored to these phones. For example, merchants may operate a mobile webpage separate from their primary webpage which is specially formatted to ease navigation by a cell phone user. Since cell phones suffer from a number of accessibility issues, often due to the limited input and output options, providing means for interacting with the business that are specially designed for cell phone users may be the only way of ensuring a quality experience.

Financial institutions are among the business operations that attempt to cater to cell phone users. As previously discussed, often this includes designing a special web page for cell phone users to access their account information, taking into account display constraints on a cell phone screen and the input capabilities of a cell phone. Other financial institutions may instead rely on an automated service which a telephone user may call, allowing the user to navigate a series of prompts in order to perform a financial transaction.

Although the efforts of these financial institutions, as well as other business operations, has increased the efficiency of interacting with the business using either data or voice communications on cellular phones, implementing such facilities often involves tremendous expenditure by the business. Not only must the business run a service for accepting the communications from its customers, but must also design, implement, and maintain the infrastructure which allows the communications received from its customers to manipulate their records on the business' existing systems.

Accordingly, what is desired is an interface for enabling business operations, such as financial institutions, to rapidly integrate a variety of communication channels, such as mobile data communications, into their business systems.

SUMMARY OF INVENTION

Embodiments of the invention include a method for interfacing a user device to a transaction system. The method includes receiving an instruction from the user device, parsing the instruction to obtain a corresponding transaction, authenticating the user device, calling a function on the transaction system for performing the transaction, receiving a response from the transaction system, and transmitting the response to the user device.

Embodiments of the invention additionally include a system for interfacing a user device to a transaction system. The system includes a first receiving module to receive an instruction from the user device, a parsing module to parse the instruction to obtain a corresponding transaction, an authentication module to authenticate the user device, a service manager module to call a function on the transaction system for performing the transaction, a second receiving module to receive a response from the transaction system, and a transmitting module to transmit the response to the user device.

Embodiments of the invention further include a computer program product comprising a computer-usable medium having computer program logic recorded thereon for enabling a processor to provide an interface between a user device and a transaction system. The computer program logic includes first receiving means for enabling a processor to receive an instruction from the user device, parsing means for enabling a processor to parse the instruction to obtain a corresponding transaction, authenticating means for enabling a processor to authenticate the user device, calling means for enabling a processor to call a function on the transaction system for performing the transaction, second receiving means for enabling a processor to receive a response from the transaction system, and transmitting means for enabling a processor to transmit the response to the user device.

Embodiments of the invention also include an interface between a user device and a transaction system. The interface includes a channel manager that establishes communications with the user device over one or more channels, the channel manager configured to receive a transaction from the user device, a security module that provides authentication, an application programming interface that enables the mapping of the transaction to a function on the transaction system, and a service manager that calls the function corresponding to the transaction using the application programming interface.

Additional embodiments of the present invention include a computer program product comprising a computer-usable medium having computer program logic recorded thereon for enabling a processor to provide an interface between a user device and a transaction system. The computer program logic includes communicating means for enabling a processor to establish communications with the user device over one or more channels, the communicating means configured to receive a transaction from the user device, authenticating means for enabling the processor to provide authentication, interfacing means for enabling a processor to provide an application programming interface for enabling the mapping of the transaction to a function on the transaction system, and servicing means for enabling a processor to call the function corresponding to the transaction using the application programming interface.

Further embodiments of the present invention include a method for interfacing a user device to a transaction system. The method includes communicating with the user device over one or more channels, receiving a transaction from the user device over one of the one or more channels, authenticating the user device, providing an application programming interface for enabling the mapping of the transaction to a function on the transaction system, and calling the function corresponding to the transaction using the application programming interface.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 11 illustrates a user authentication and transaction interface on a user device, in accordance with an embodiment of the present invention.

Figure 1:
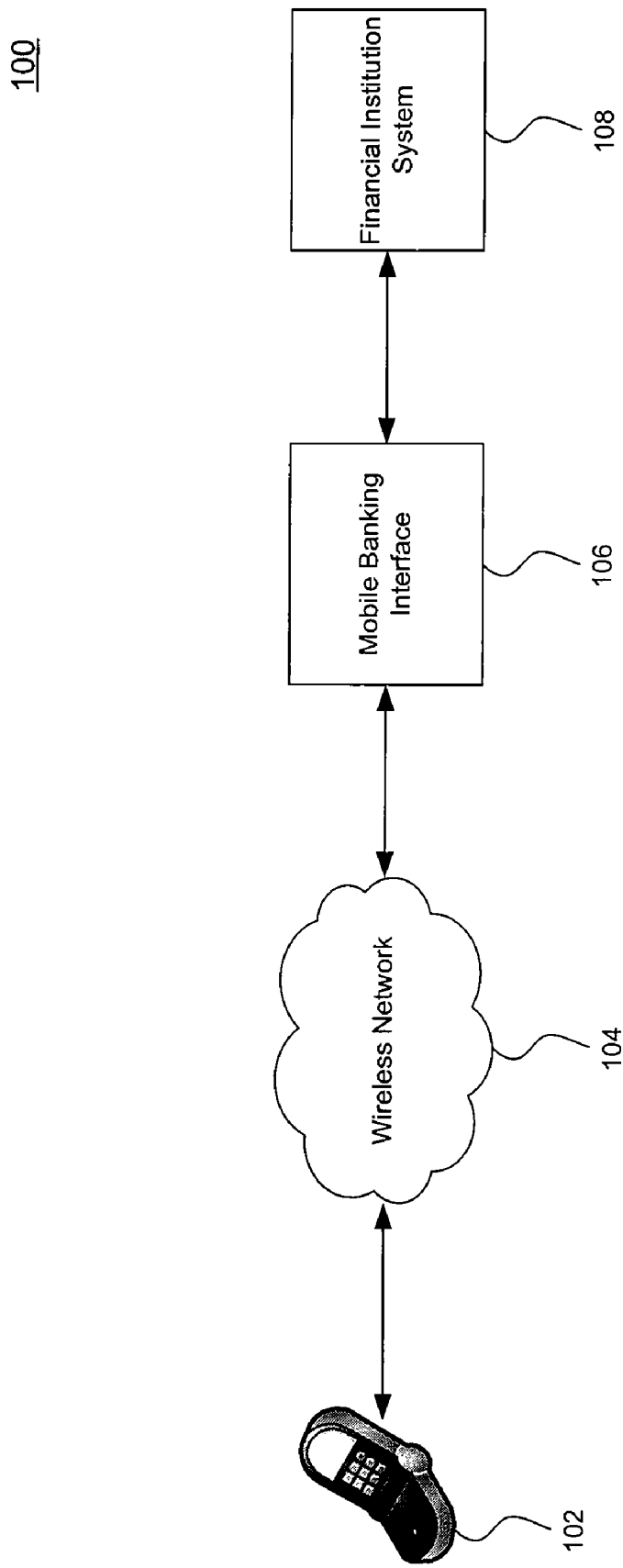
FIG. 1 illustrates a mobile banking network, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

FIG. 1 is a network 100 depicting a mobile banking network, in accordance with an embodiment of the present invention. The network 100 includes a user device 102, a wireless network 104, a mobile banking interface 106, and a financial institution system 108. As used in this specification, user device 102 will commonly be a cellular telephone having data communication capabilities, although one skilled in the relevant arts will readily appreciate that any communication device, or device having communication capabilities, can be substituted. Similarly, network 104 will commonly be a wireless network throughout this specification, although one skilled in the relevant arts will likewise appreciate that, depending on the capabilities of user device 102, other network types, to include wired networks of any type, or wireless technology of any type (e.g., Bluetooth, cellular, wi-fi, ad hoc, etc.), can be substituted for wireless network 104.

Financial system 108 will commonly be a banking system throughout this specification, the system for enabling a user to access his or her financial records and perform financial transactions such as balance inquiries or transfers of funds from one of the user's accounts to another, in accordance with an embodiment of the present invention. However, one skilled in the relevant arts will appreciate that system 108 need not be limited to the banking or financial context, and may include other systems which a user device 102 operates with. By way of example, and not limitation, mobile banking interface 106 will be discussed throughout this specification as providing an interface for banking functions available to a user through financial institution system 108, but one skilled in the relevant arts will appreciate that interface 106 and system 108 could instead allow a user to access, through user device 102, other systems. By way of example, and not limitation, interface 106 and system 108 could allow a user of user device 102 to access a merchant system (substituted for financial system 108) in order to initiate a purchase accessed through a merchant system interface (substituted for mobile banking interface 106).

Financial system 108 is, in accordance with an embodiment of the present invention, a webpage front-end to a banking database (not shown). Normally, a user would access such a system by opening a web browser on a personal computer an accessing the webpage directly, utilizing functions embedded within the webpage to interact with their account information stored at the financial institution. In accordance with an additional embodiment of the present invention, financial system 108 is a network-accessible entry point for users, such as customers, of the financial institution to access their account information. In accordance with a further embodiment of the present invention, financial system 108 is a core banking system manually operated by a bank employee. One skilled in the relevant arts will appreciate that additional configurations for financial system 108 are within the scope of the present invention, and the aforementioned configurations are presented by way of example, not limitation.

Mobile banking interface 106 eases the communications between user device 102 and financial system 108 by receiving instructions from user device 102 and translating the instructions into operations understandable by financial system 108, as further disclosed below, in accordance with an embodiment of the present invention.

Furthermore, mobile banking interface 106 includes logic for establishing communications with user device 102 over wireless network 104, in accordance with an embodiment of the present invention. Wireless network 104 is, in accordance with an additional embodiment of the present invention, a cellular communications network.

II. Network Communications

Figure 2:
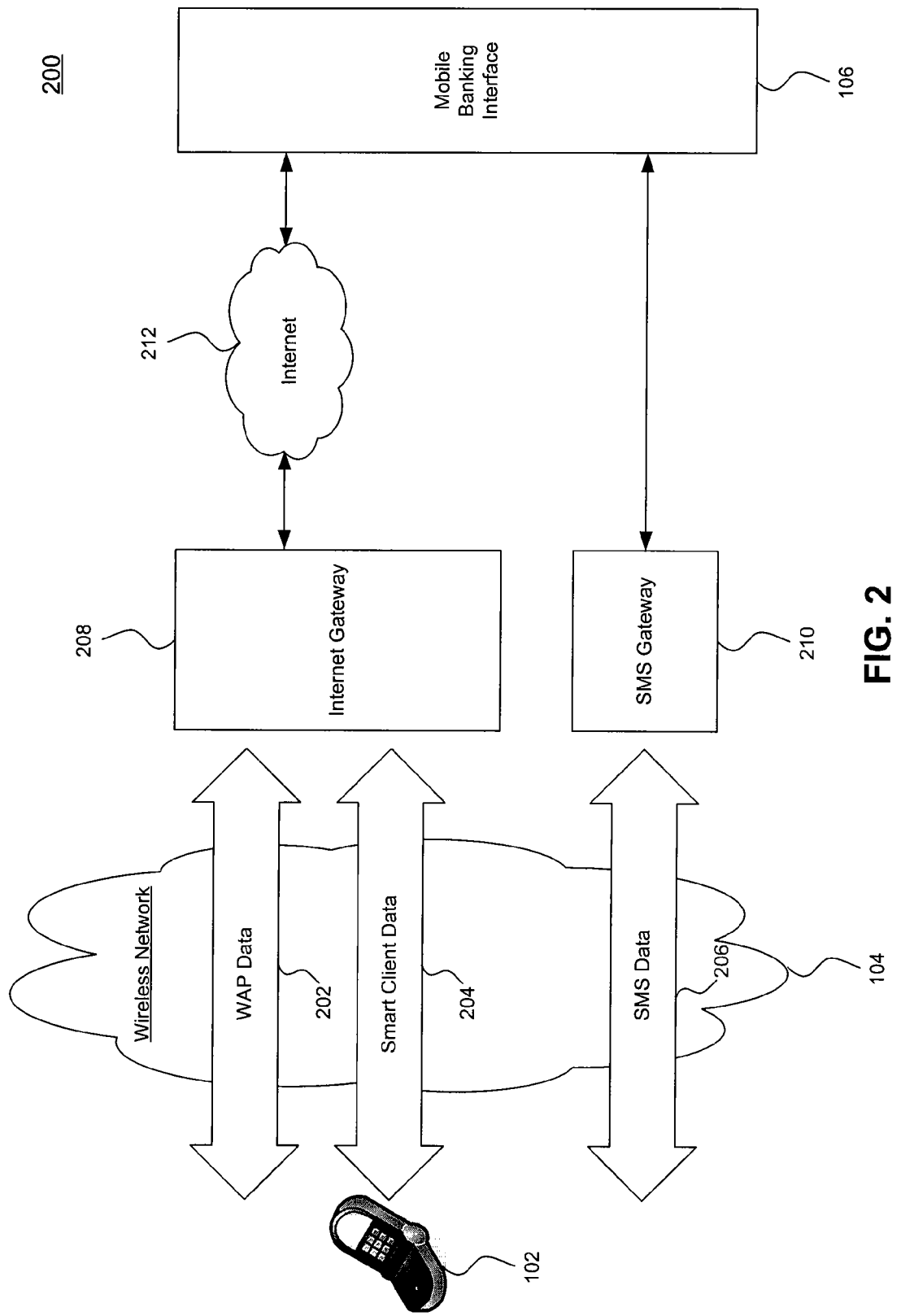
FIG. 2 illustrates communication channels in a mobile banking network, in accordance with an embodiment of the present invention.

FIG. 2 is a network 200 illustrating communication channels in a mobile banking network, in accordance with an embodiment of the present invention. As previously disclosed, a user device 102 is operable to connect to a mobile banking interface 106 over wireless network 104 in order to access a financial system (not shown). One skilled in the relevant arts will recognize that a user device 102, such as a cellular phone, can communicate using a number of different protocols over a wireless network 104, such as a cellular communications network.

In accordance with an embodiment of the present invention, user device 102 is configured to transmit data conforming to the Wireless Application Protocol ("WAP") 202 over wireless network 104. In accordance with an additional embodiment of the present invention, user device 102 is configured to transmit data conforming to the Short Message Service ("SMS") protocol 206 over wireless network 104. In accordance with a further embodiment of the present invention, user device 102 is configured to transmit smart client data 204 over an additional data communications protocol over wireless network 104. One skilled in the relevant arts will appreciate that additional communication protocols are usable over wireless network 104 in order to allow a user device 102 to access mobile banking interface 106.

In the case of a user device 102 which communicates using either WAP data 202 or smart client data 204, an Internet gateway 208 is used to receive the WAP data 202 or smart client data 204 over wireless network 104 and forward the messages over the Internet 212 to mobile banking interface 106, in accordance with an embodiment of the present invention. One skilled in the relevant arts will recognize that the precise configuration of the Internet gateway 208 and the Internet 212 as shown in FIG. 2 need not exist in every system, where instead other means for forwarding the WAP data 202 and smart client data 204 communications to mobile banking interface 106 are implemented.

If user device 102 instead communicates using SMS data 206 over wireless network 104, an SMS gateway 210 is used to receive the SMS data 206 communications from wireless network 104 and forward the communications to mobile banking interface 106, in accordance with an embodiment of the present invention. In accordance with an additional embodiment of the present invention, SMS gateway 210 is the Sybase 365™ system provided by Sybase, Inc. of Dublin, Calif. One skilled in the relevant arts will recognize that the precise configuration of the SMS gateway 210 as shown in FIG. 2 need not exist in every system, where instead other means for forwarding the SMS data 206 communications to mobile banking interface 106 are implemented.

In accordance with an embodiment of the present invention, user device 102 transmits SMS data 206 to SMS gateway 210 through the use of a special "short code" assigned to the mobile banking interface 106, in order to allow SMS gateway 210 to properly route the SMS data 206 to the mobile banking interface 106. In accordance with an additional embodiment of the present invention, the short code is instead assigned to the financial institution which is fronted by mobile banking interface 106.

In accordance with an embodiment of the present invention, user device 102 transmits WAP data 202 or smart client data 204 to Internet gateway 208 through the use of an Internet Protocol ("IP") address assigned to the mobile banking interface 106, in order to allow the Internet gateway 208 to properly route the WAP data 202 or smart client data 204 to the mobile banking interface 106. In accordance with an additional embodiment of the present invention, the IP address is instead assigned to the financial institution which is fronted by mobile banking interface 106.

III. Mobile Banking Interface

Figure 3:
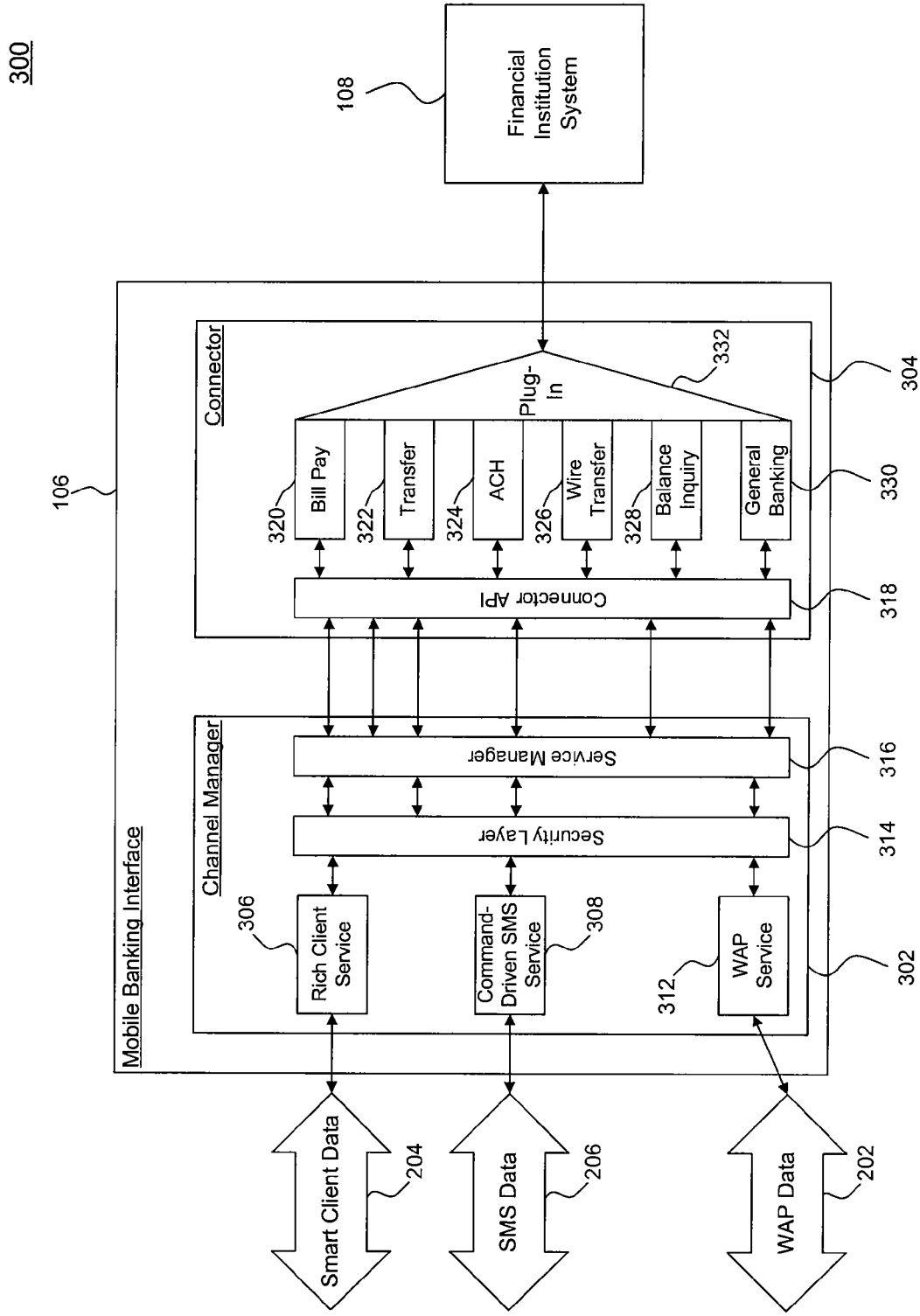
FIG. 3 illustrates a mobile banking interface, in accordance with an embodiment of the present invention.

FIG. 3 is a network 300 illustrating additional features of mobile banking interface 106, in accordance with an embodiment of the present invention. As previously illustrated in FIG. 2, mobile banking interface 106 is capable of receiving smart client data 204, SMS data 206, or WAP data 202, as well as data over any other communications protocol which the mobile banking interface 106 has been programmed to receive, in accordance with an embodiment of the present invention.

Mobile banking interface comprises a channel manager module 302 for managing communications over one or more data channels, such as the channels associated with smart client data 204, SMS data 206, and WAP data 202, in accordance with an embodiment of the present invention. Channels are handled by a corresponding service module within channel manager 302, such as rich client service module 306 for interfacing with smart client data 204, in accordance with an embodiment of the present invention. In accordance with an additional embodiment of the present invention, channel manager 302 comprises a command-driven SMS service module 308 for interfacing with SMS data 206. In accordance with a further embodiment of the present invention, channel manager 302 comprises a WAP service module 312 for interfacing with WAP data 202. One skilled in the relevant arts will appreciate that additional service modules can be developed and added to channel manager 302 for interfacing with additional communication channels.

Further details regarding the command-driven SMS service 308 of channel manager 302 are disclosed in commonly-owned U.S. patent application Ser. No. 12/183,390, filed Jul. 31, 2008, entitled MOBILE BANKING WITH SHORT MESSAGE SERVICE which is hereby incorporated by reference in its entirety.

Channel manager 302 further comprises a security layer for authenticating a user or a user device, in accordance with an embodiment of the present invention. The security layer is configured to determine a level of authentication required for performing an instruction from a user received through a service module, such as service modules 306, 308, and 312, authenticating the user or user device, and enabling the processing of the instruction if authentication is achieved, in accordance with an embodiment of the present invention.

Channel manager 302 further comprises service manager 316, in accordance with an embodiment of the present invention. Channel manager 302 facilitates the communication of instructions received from a user device through a service module, such as service modules 306, 308, and 312, to the financial system 108 through a connector module 304, which is fully discussed below, in accordance with an embodiment of the present invention. One skilled in the relevant arts will appreciate that the capabilities of service manager 316 need not be centralized in a single module, and can instead be optionally distributed throughout channel manager 302. In accordance with an embodiment of the present invention, the capabilities of service manager 316 are localized within each service module, such as service modules 306, 308, and 312. In accordance with a further embodiment of the present invention, the channel manager 302 is part of the service manager 316.

Connector module 304 enables channel manager 302 to call functions in financial system 108 through, for example, service manager 316, for performing the instructions received from a user device through a service module, such as service modules 308, 308, and 312, in accordance with an embodiment of the present invention. The functionality of connector module 304 is achieved by providing connector application programming interface ("API") 318 within connector module 304, in accordance with an embodiment of the present invention.

Connector API 318 provides an interface to functions provided by financial system 108, which can be called by service manager 316 to carry out instructions received from a user device over a service module, such as service modules 306, 308, and 312. Examples of functions provided by financial system 108 include bill pay 320 functionality, transfer 322 functionality, automated clearing house ("ACH") 324 functionality, wire transfer 326 functionality, balance inquiry 328 functionality, and general banking 330 functionality. One skilled in the relevant arts will recognize that financial system 108 can provide additional functionality in order to enable a user to interact with the financial institution, and the aforementioned functions provided by financial system 108 are described by way of example, and not limitation. Furthermore, as previously disclosed, such functionality is not limited to financial services, and can be extended to other applications, including any application involving user interaction.

In order to implement the functions described in connector API 318, a connector plug-in 332 is provided in connector 304, in accordance with an embodiment of the present invention. Plug-in 332 implements one or more of the functions described by connector API 318, such as, for example, transfer 322 functionality, or balance inquiry 328 functionality. In accordance with an embodiment of the present invention, a developer creates an implementation of a plug-in 332 for use with connector 304. In accordance with a further embodiment of the present invention, multiple plug-ins 332 are provided concurrently for connecting to multiple financial institution system 108 back-ends. One skilled in the relevant arts will appreciate that a number of configurations exist for plug-in 332, and the aforementioned configurations are provided by way of example, and not limitation.

In accordance with an embodiment of the present invention, connector API 318 provides a function specification for defining the input and output parameters used by the function. Service manager 316 is configured to call the function if it has been implemented in plug-in 332. The function is implemented in plug-in 332 by defining a function for each of the one or more functions described by connector API 318, the implemented function having the input and output parameters defined by the corresponding function specification, in accordance with an embodiment of the present invention. For example, the specification for the transfer 322 function can take a source account, a destination account, and a dollar value as inputs, and provide a confirmation of success or failure as the output. An actual implementation of the transfer 322 function within plug-in 322 would use the aforementioned inputs to perform the transfer transaction and would return a success or failure message, in accordance with the function specification of connector API 318. In accordance with an embodiment of the present invention, this implementation is accomplished through the use of virtual functions.

Plug-in 332 implements the functions by calling one or more remote functions of financial system 108, in accordance with an embodiment of the present invention. For example, if financial system 108 does not have a dedicated communications service for interfacing with plug-in 332, but has an online banking service, plug-in 332 can be implemented to access the financial system 108's online banking service over the Internet to ultimately perform the implemented function, in accordance with an embodiment of the present invention.

IV. Additional Functionality of the Mobile Banking Interface

Figure 4:
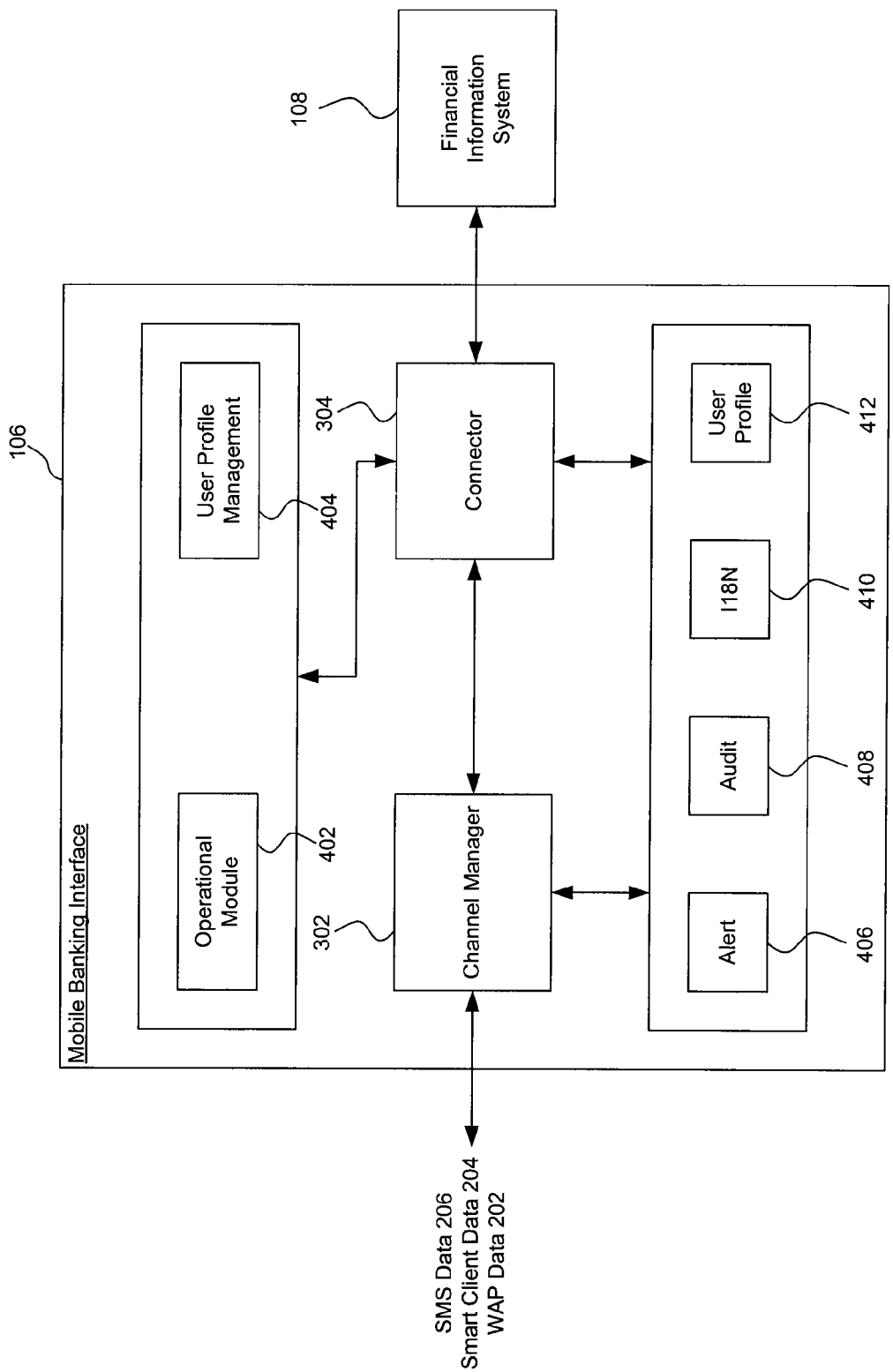
FIG. 4 illustrates additional modules of a mobile banking interface, in accordance with an embodiment of the present invention.

FIG. 4 illustrates a network 400 including mobile banking interface 106, in accordance with an embodiment of the present invention. As before, mobile banking interface 106 includes channel manager 302 and connector 304, but also includes additional modules for enhancing the functionality of mobile banking interface 106. These additional modules are described in more detail below.

Operational module 402 is a web application that allows employees of the financial institution to perform employee-oriented banking tasks, such as reporting, case management, or entitlement management, in accordance with an embodiment of the present invention. User profile management module 404 is a web application that allows a customer of the financial institution, as well as employees of the financial institution, to manage the customer's profile, such as user profile 412, as it relates to the mobile banking interface 106, in accordance with an embodiment of the present invention.

Alert module 406 is configured to send messages to the user device related to an alert condition, in accordance with an embodiment of the present invention. For example, mobile banking interface 106 can provide an alert to the user device through alert module 406 if a user's account balance drops below a certain amount.

Audit module 408 provides a mechanism for storing events and messages that pass through mobile banking interface 106, in accordance with an embodiment of the present invention. In accordance with an embodiment of the present invention, audit module 408 is configured to store all instructions received from a user device in channel manager 302. One skilled in the relevant arts will recognize that audit module 408 can be configured to log any communications occurring within mobile banking interface 106, either internal to mobile banking interface 106, or in communications with systems outside of mobile banking interface 106, such as financial system 108. Audit module 408 is further operable to provide audit log reports to employees of the financial institution through operational module 402, in accordance with an embodiment of the present invention.

I18N module 410 enables the internationalization of mobile banking interface 106, in accordance with an embodiment of the present invention. In accordance with a further embodiment of the present invention, all messages sent to a user device are defined in resource files, and thus can be localized. Similarly, formats for dates, numbers, and currencies can be customized for each locale, in accordance with an embodiment of the present invention. In accordance with an additional embodiment of the present invention, instructions received from a user device at channel manager 302 are interpreted in accordance with a customizable instruction language corresponding to a user locale.

V. Operation of the Mobile Banking Interface

Figure 5:
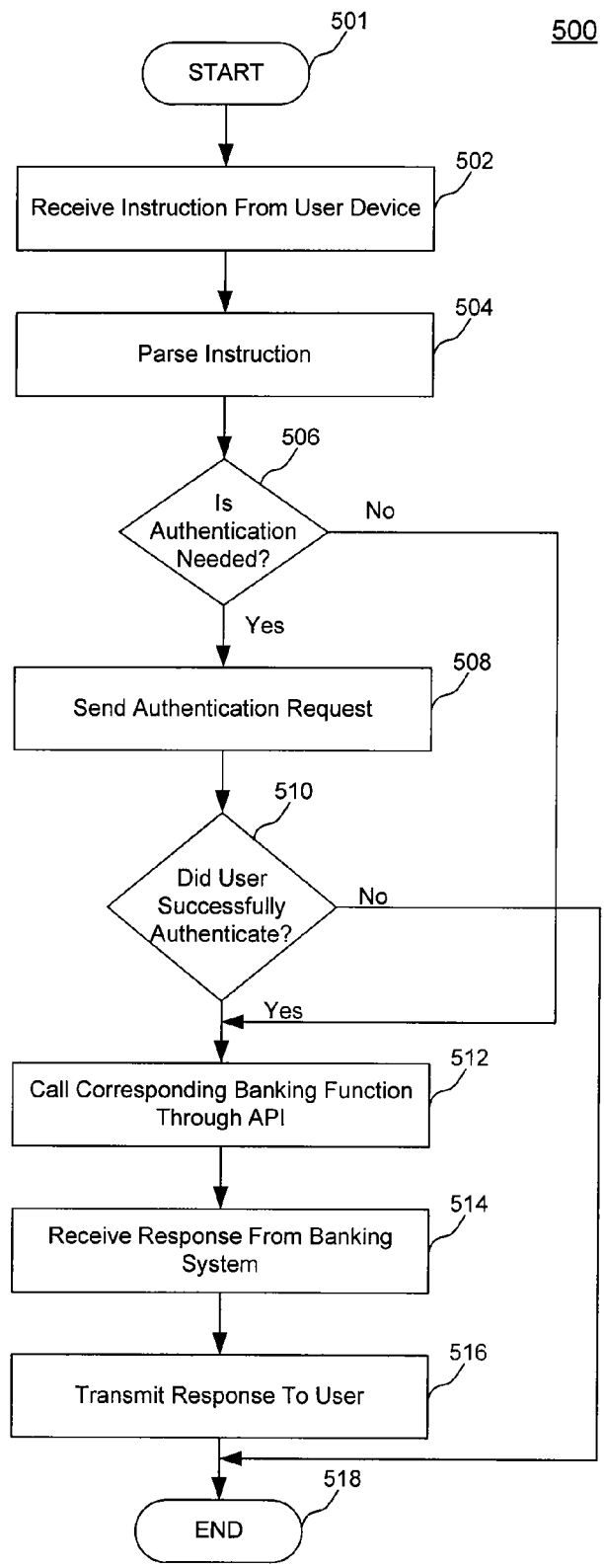
FIG. 5 is a flowchart depicting steps by which a mobile banking interface can interface with a user device and a banking system, in accordance with an embodiment of the present invention.

FIG. 5 is a flowchart 500 depicting an operational flow of mobile banking interface 106, in accordance with an embodiment of the present invention. Flowchart 500 is described with continued reference to network 300 of FIG. 3. The method begins at step 501 and proceeds to step 502, where the mobile banking interface 106 receives an instruction from the user device. At step 504, the mobile banking interface 106 parses the instruction. The instruction is parsed, in accordance with an embodiment of the present invention, at a service module in mobile banking interface 106, such as service modules 306, 308, and 312.

At step 506, the mobile banking interface 106 determines whether authentication is needed in order to process the parsed instruction. If no authentication is needed, the method continues to step 512; otherwise, if authentication is needed, the method then proceeds to step 508 where an authentication request is sent to the user device. In accordance with an embodiment of the present invention, authentication is performed by the security layer 314 of mobile banking interface 106. At step 510, the mobile banking interface 106 determines whether authentication was successful. If authentication was unsuccessful, the method proceeds to step 518 where processing ends. If authentication was successful, the method continues to step 512.

At step 512, the mobile banking interface 106 calls a function corresponding to the parsed instruction from step 504. In accordance with an embodiment of the present invention, the function is called through connector API 318, with the function implementation provided by plug-in 332. As previously disclosed, the function communicates with financial system 108 to perform the requested instruction, and at step 514 the mobile banking interface 106 receives a response from the financial system 108 as a result of processing the function. At step 516, the response is provided to the user device, and the method ends at step 518.

VI. Operation of the Security Layer

Figure 6:
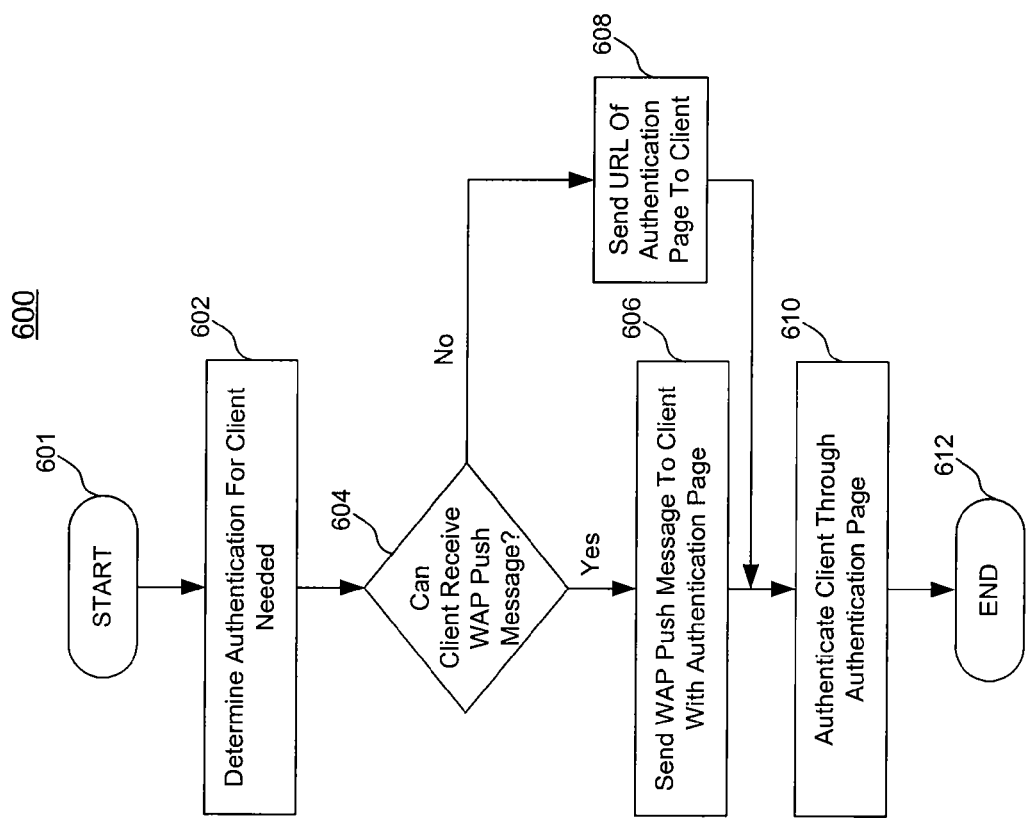
FIG. 6 is a flowchart depicting steps for providing user authentication to a mobile banking interface, in accordance with an embodiment of the present invention.

FIG. 6 is a flowchart 600 depicting an operational flow of security layer 314, in accordance with an embodiment of the present invention. The method begins at step 601 and proceeds to step 602 where a determination is made that authentication of a user on the user device is needed. At step 604, the ability of the user device to support a WAP push message is determined. If the user device can support a WAP push message, then at step 606 a WAP push message is sent to the user device, instructing the user device to load an authentication page. Otherwise, if the user device cannot support a WAP push message, then at step 608 a URL for the authentication page is sent to the user device. In accordance with an embodiment of the present invention, the URL sent to the user device at step 608 is sent in an SMS message. At step 610, the user on the user device is authenticated through the authentication page, and the method ends at step 612.

Further details regarding the security layer 314, with detail to its interactions with command-driven SMS service 308 of channel manager 302, are disclosed in commonly-owned U.S. patent application Ser. No. 12/183,390, filed Jul. 31, 2008, entitled MOBILE BANKING WITH SHORT MESSAGE SERVICE, which is hereby incorporated by reference in its entirety.

VII. Additional Functionality of Service Modules

Figure 7:
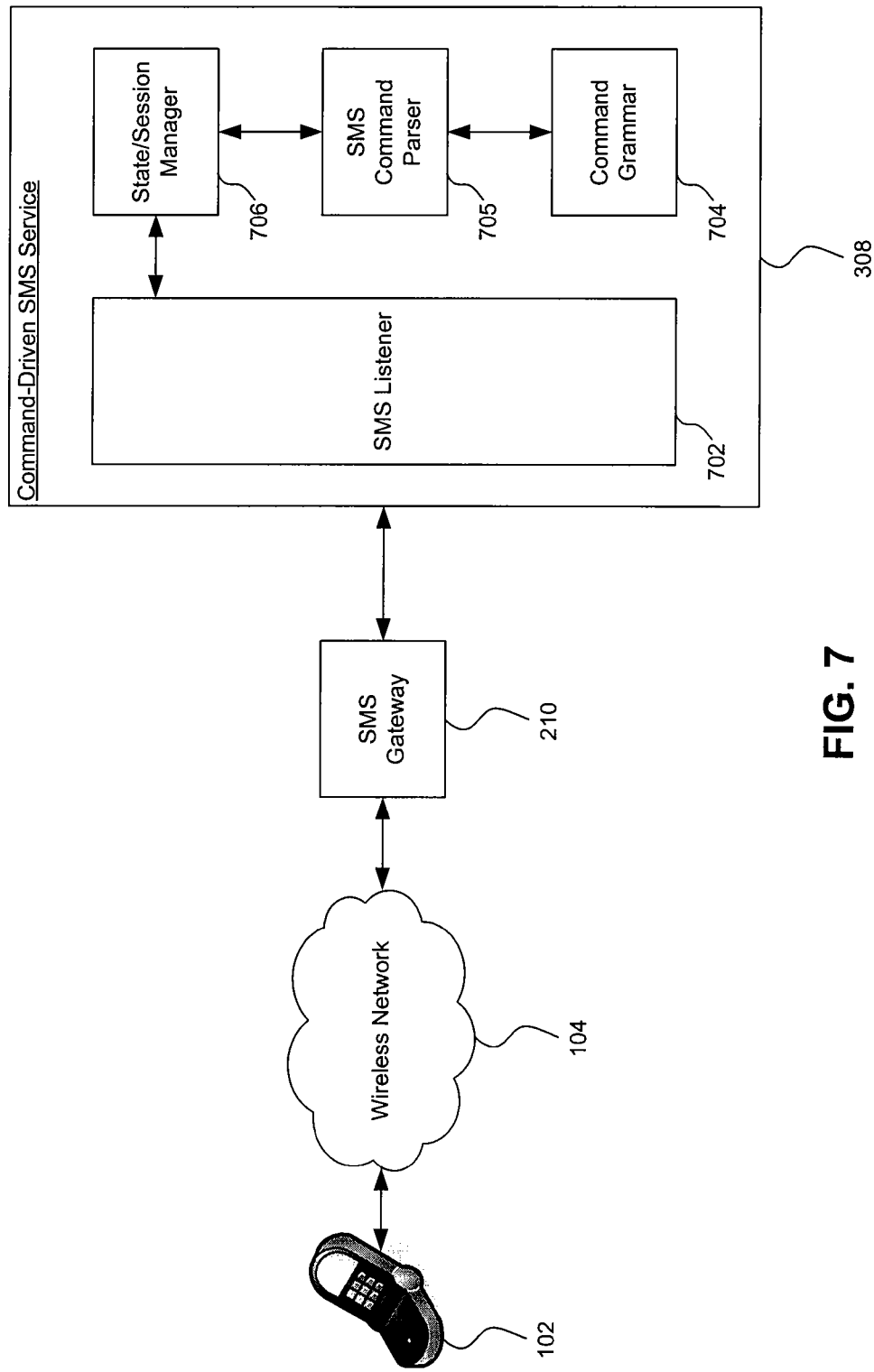
FIG. 7 illustrates an SMS service for a mobile banking interface, in accordance with an embodiment of the present invention.

FIG. 7 illustrates a network 700 including command-driven SMS service 308, in accordance with an embodiment of the present invention. As previously disclosed, user device 102 is operable to communicate over wireless network 104 with SMS gateway 210 in order to transmit SMS messages to the mobile banking interface. SMS messages received by the mobile banking interface are handled by command-driven SMS service 308, in accordance with an embodiment of the present invention.

Command-driven SMS service 308 includes SMS listener module 702, which is configured to receive SMS messages from SMS gateway 210, in accordance with an embodiment of the present invention. Command-driven SMS service 308 additionally includes state and session manager 706, which is configured to maintain a state associated with the user device 102, in accordance with an additional embodiment of the present invention. In accordance with a further embodiment of the present invention, command-driven SMS service 308 includes SMS command parser 705 coupled to command grammar module 704 for interpreting the instructions sent by user device 102.

Further details regarding command-driven SMS service 308 are disclosed in commonly-owned U.S. patent application Ser. No. 12/183,390, filed Jul. 31, 2008, entitled MOBILE BANKING WITH SHORT MESSAGE SERVICE, which is hereby incorporated by reference in its entirety.

Figure 8:
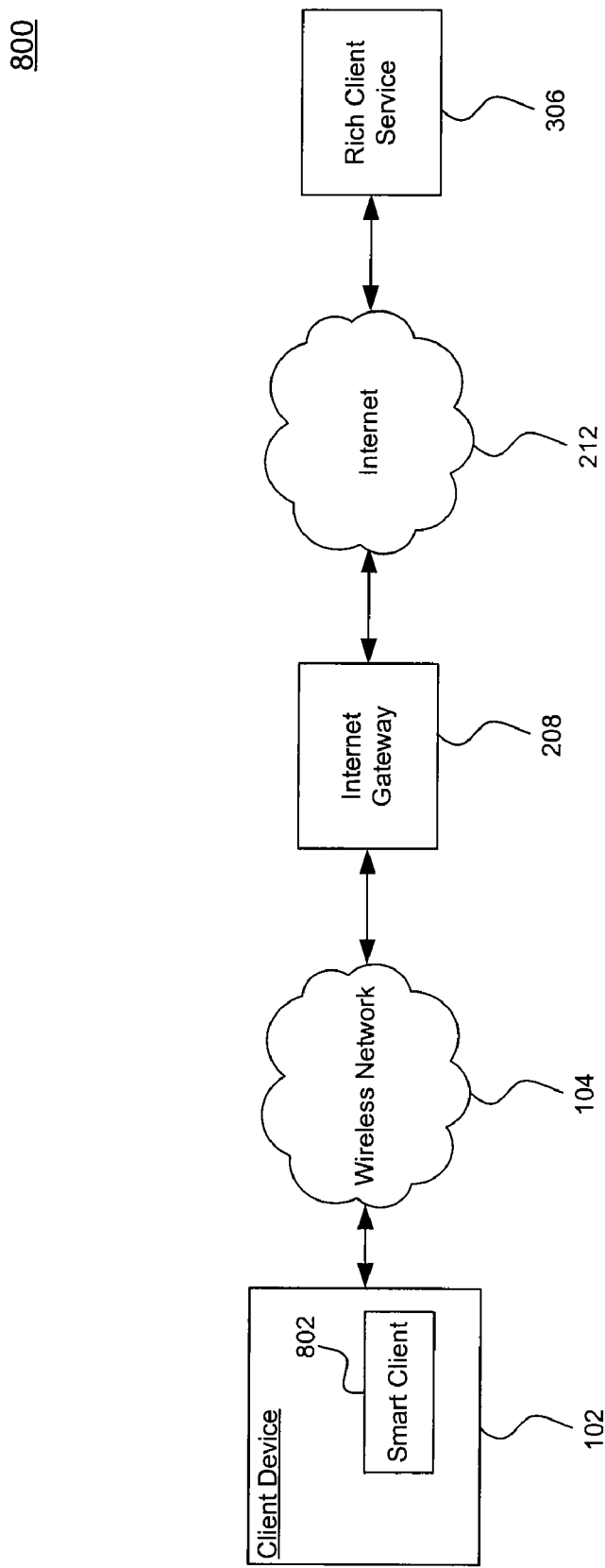
FIG. 8 illustrates a smart client service for a mobile banking interface, in accordance with an embodiment of the present invention.

FIG. 8 illustrates a network 800 including rich client service 306, in accordance with an embodiment of the present invention. As previously disclosed, user device 102 is operable to communicate over wireless network 104 with Internet gateway 208 in order to transmit smart client messages over the Internet 212 to the mobile banking interface, in accordance with a further embodiment of the present invention.

In order to communicate with rich client service 306, smart client 802 is installed on user device 102, in accordance with an embodiment of the present invention. Because smart client 802 is provided for the specific purpose of communicating with rich client service 306, in accordance with an embodiment of the present invention, the user experience of smart client 802 can be optimized in order to facilitate interaction with the financial institution.

Figure 9:
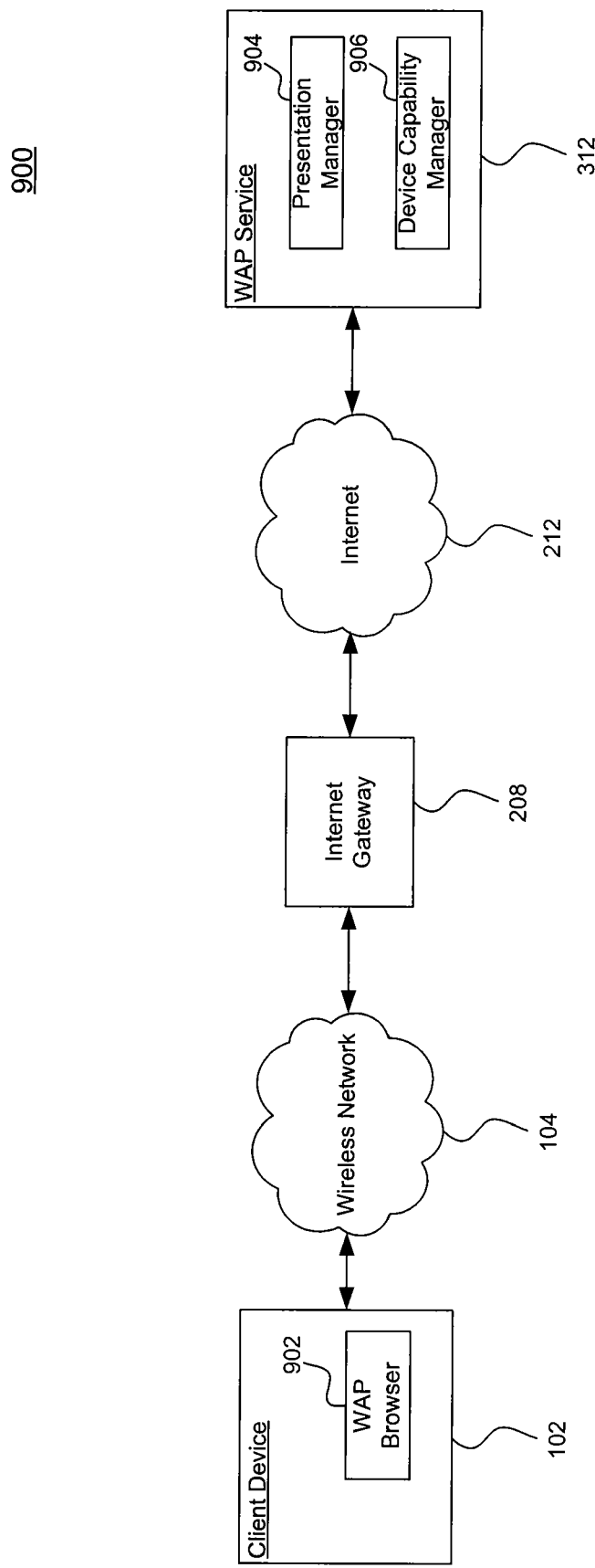
FIG. 9 illustrates a WAP service for a mobile banking interface, in accordance with an embodiment of the present invention.

FIG. 9 illustrates a network 900 including WAP service 312, in accordance with an embodiment of the present invention. As previously disclosed, user device 102 is operable to communicate over wireless network 104 with Internet gateway 208 in order to transmit WAP messages over the Internet 212 to the mobile banking interface, in accordance with a further embodiment of the present invention.

In order to communicate with WAP service 312, WAP browser 902 is installed on user device 102, in accordance with an embodiment of the present invention. In order to optimize user experience when interacting through WAP browser 902, WAP service 312 includes a presentation manager module 904 and a device capability manager module 906, in accordance with an additional embodiment of the present invention. Device capability manager module 906 is configured to determine the support of protocol and rendering abilities of the user device, and to send appropriate response templates, in accordance with an embodiment of the present invention. Presentation manager module 904 is configured to generate WAP pages to return to the user device, in accordance with a further embodiment of the present invention.

VIII. Command Authentication Levels

Figure 10:
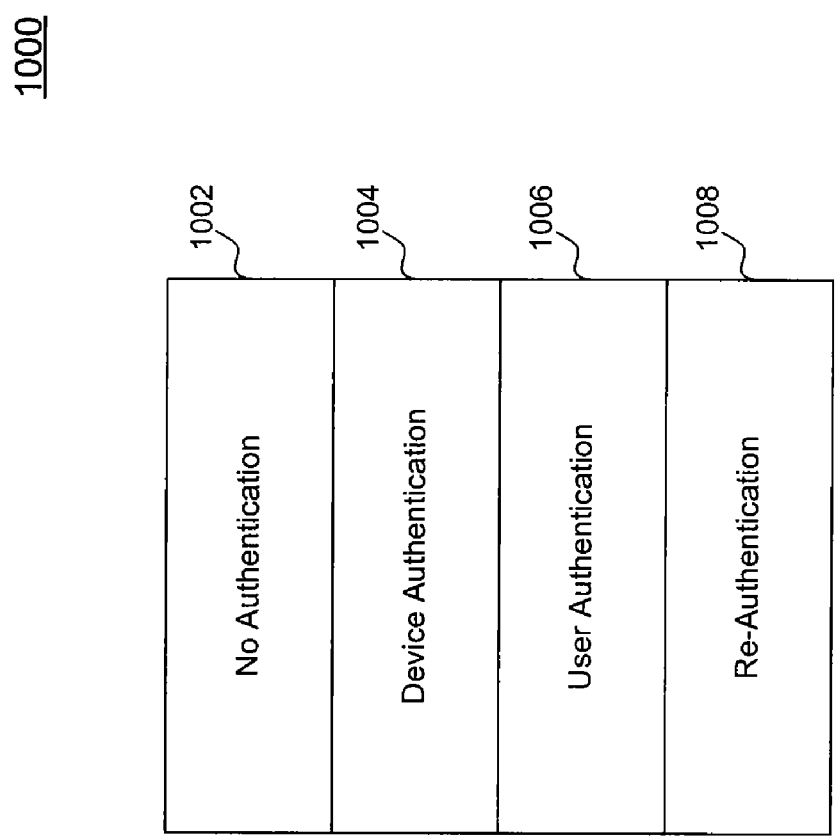
FIG. 10 illustrates command security levels, in accordance with an embodiment of the present invention.

FIG. 10 is a table 1000 listing instruction security levels, in accordance with an embodiment of the present invention. Each instruction received from a user device at a service module, such as service modules 306, 308, and 312 of FIG. 3, is associated with a particular authentication level, in accordance with an embodiment of the present invention. "No authentication" instruction security level 1002 is associated with instructions that do not require a user device, or the user of the user device, to authenticate with security layer 314 prior to processing of the instruction. "Device authentication" instruction security level 1004 is associated with instructions that require the authentication of the user device itself prior to processing of the instruction. "User authentication" instruction security level 1006 is associated with instructions that require the authentication of the user of the user device prior to processing of the instruction. "Re-authentication" instruction security level 1008 is associated with instructions that require the re-authentication of the user of the user device prior to processing of the instruction, even if the user has previously been authenticated. One skilled in the relevant arts will recognize that additional instruction security levels can be defined and associated with instructions in a similar manner to the aforementioned instruction security levels.

Further details regarding command authentication levels, as regarding command-driven SMS service 308, are disclosed in commonly-owned U.S. patent application Ser. No. 12/183,390, filed Jul. 31, 2008, entitled MOBILE BANKING WITH SHORT MESSAGE SERVICE, which is hereby incorporated by reference in its entirety.

IX. User Interface

FIG. 11 illustrates a user interface 1102 and 1104 for authenticating a user on a user device 102, in accordance with an embodiment of the present invention. FIG. 11 additionally illustrates a user interface 1106 and 1108 for performing transactions and viewing the results of a transaction on a user device 102, in accordance with a further embodiment of the present invention.

User interface 1102 and 1104 illustrate a user interface used for authenticating a user on a user device 102 using an authentication page, as described in step 610 of flowchart 600 in FIG. 6, in accordance with an embodiment of the present invention. Accordingly, the authentication page of user interface 1102 and 1104 is useful for authenticating a user communicating with mobile banking interface 106 using SMS data 206 by sending the user device 102 a URL to the authentication page 1102 and 1104, or by sending the user device 102 a WAP push message with the authentication page 1102 and 1104, in accordance with an embodiment of the present invention.

Additionally, user interface 1102 and 1104 are used in order to authenticate a user on a user device 102 accessing mobile banking interface 106 using WAP data 202. With reference to network 900 of FIG. 9, when user device 102 accesses WAP service 312 using WAP browser 902, the WAP service 312 is configured to direct the user device 102 to the user interface of 1102 and 1104 for authentication, in accordance with an embodiment of the present invention. After authentication, the user of user device 102 can interact with the WAP service 312 through an additional user interface such as, for example, the user interface shown in 1106 and 1108, in accordance with an additional embodiment of the present invention.

Further details regarding the authentication user interface, as regarding command-driven SMS service 308, are disclosed in commonly-owned U.S. patent application Ser. No. 12/183,390, filed Jul. 31, 2008, entitled MOBILE BANKING WITH SHORT MESSAGE SERVICE, which is hereby incorporated by reference in its entirety.

One skilled in the relevant arts will recognize that the precise configuration of the user interface can be different from the user interface illustrated in FIG. 11, and that the aforementioned user interfaces are provided by way of example, and not limitation.

X. Additional Functionality of Command Grammar Module

Figure 12:
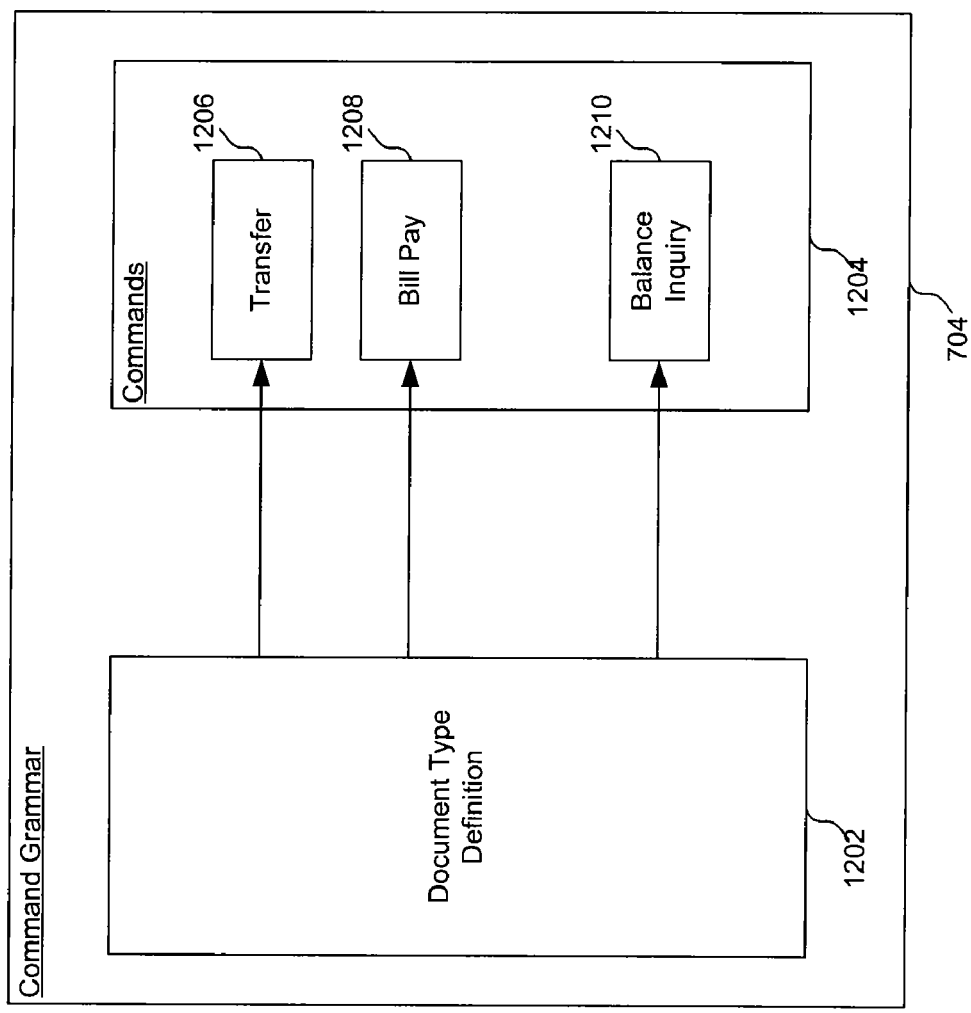
FIG. 12 illustrates a command grammar module, in accordance with an embodiment of the present invention.

FIG. 12 illustrates a network 1200 including command grammar module 704, in accordance with an embodiment of the present invention. In accordance with an additional embodiment of the present invention, command grammar module 704 includes a document type definition ("DTD") 1202 for defining one or more commands 1204. The commands defined by command grammar module 704 include, for example, transfer command 1206, bill pay command 1208, and balance inquiry command 1210.

Through the use of DTD 1202, a developer of commands 1204 can use a definition provided by DTD 1202 to define a command, such as commands 1206, 1208, and 1210 to interpret an instruction received from a user device at command-driven SMS service module 308 of FIG. 3.

Further details regarding the command grammar module, as regarding command-driven SMS service 308, are disclosed in commonly-owned U.S. patent application Ser. No. 12/183,390, filed Jul. 31, 2008, entitled MOBILE BANKING WITH SHORT MESSAGE SERVICE, which is hereby incorporated by reference in its entirety.

XI. Localization Methodology

Figure 13:
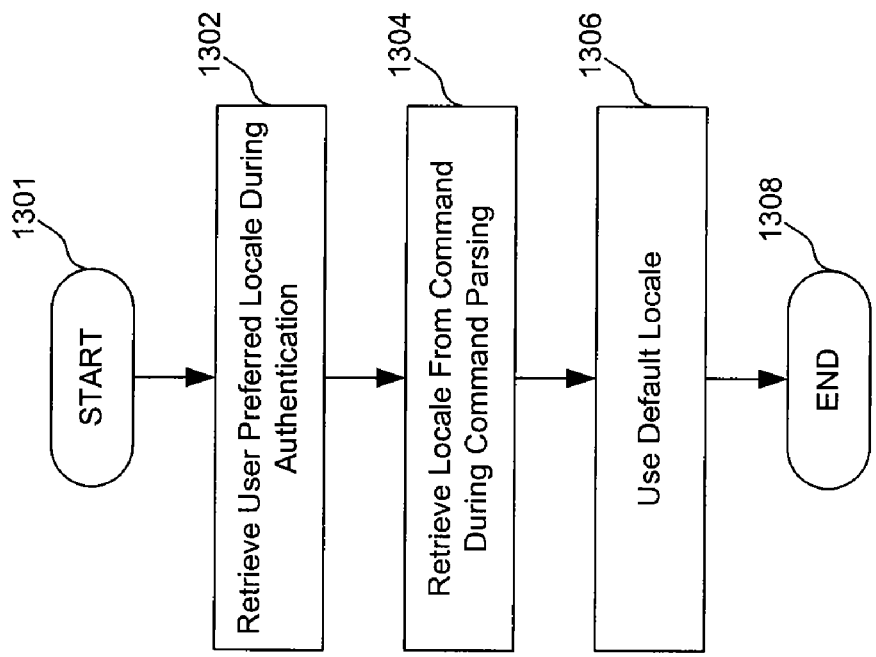
FIG. 13 is a flowchart depicting steps by which a user locale is determined, in accordance with an embodiment of the present invention.

FIG. 13 is a flowchart 1300 depicting an operational flow of I18N module 410 of FIG. 4, in accordance with an embodiment of the present invention. The method of flowchart 1300 is used by I18N module 410 in determining the locale to be used in processing an instruction from a user device, in accordance with an additional embodiment of the present invention.

The method begins at step 1301 and proceeds to step 1302, where the preferred locale of the user of the user device is retrieved during authentication of the user. When authentication of the user is performed, the identity of the user is ascertained, and information about the user's preferences are obtained from user profile information, such as the user profile information of user profile module 412, in accordance with an embodiment of the present invention.

If the user's preferred locale cannot be determined at step 1302, then at step 1304 the locale is determined from the instruction received from the user device. In accordance with an embodiment of the present invention, the instruction will be in a particular language, and the locale is determined to be the locale associated with the particular language.

If the locale cannot be determined at step 1304, then a default locale is used in step 1306. In accordance with an embodiment of the present invention, the default locale is United States English. The method then ends at step 1308.

XII. Example Computer System Implementation

Figure 14:
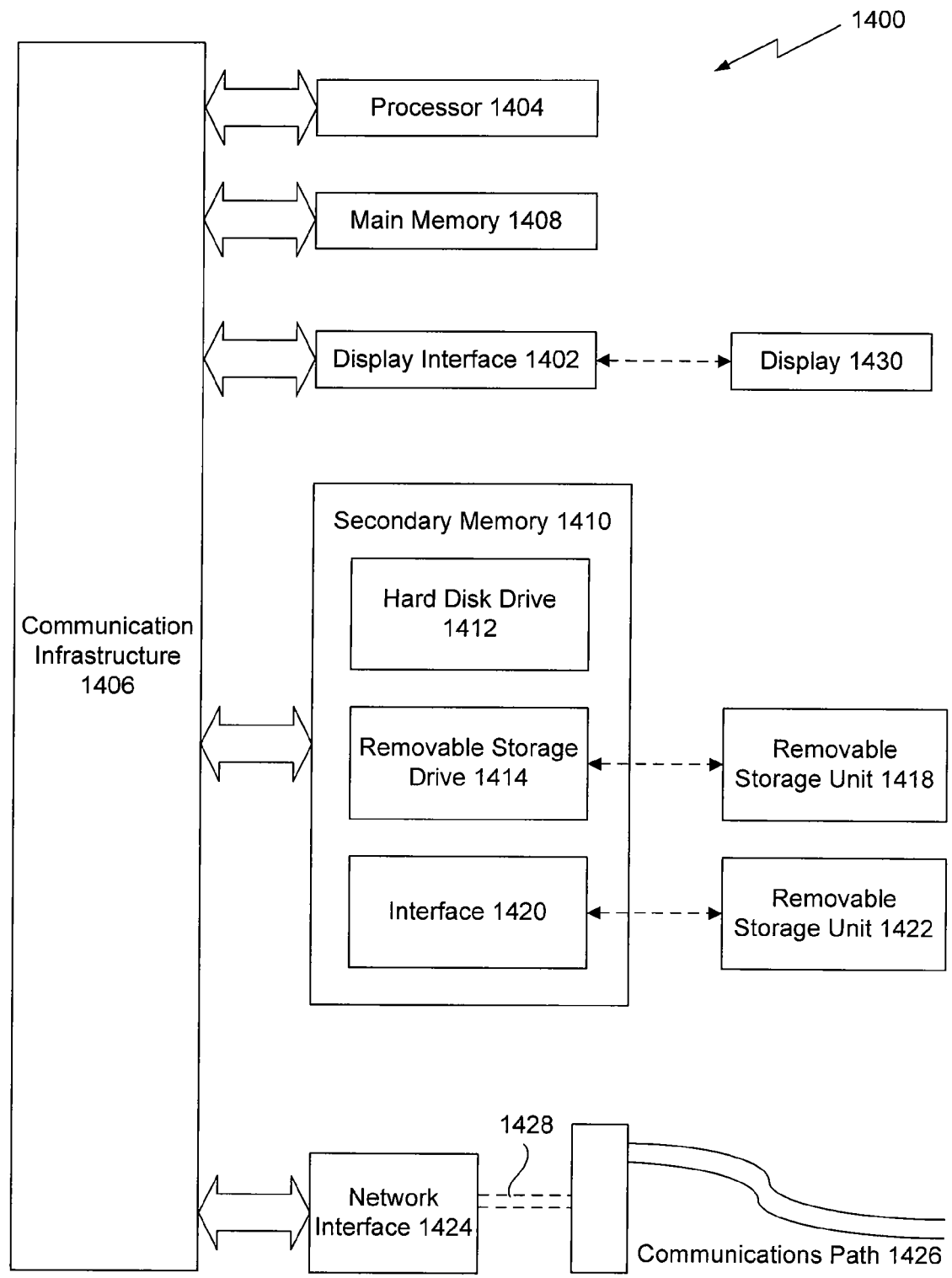
FIG. 14 depicts an example computer system in which embodiments of the present invention may be implemented.

Various aspects of the present invention can be implemented by software, firmware, hardware, or a combination thereof. FIG. 14 illustrates an example computer system 1400 in which the present invention, or portions thereof, can be implemented as computer-readable code. For example, the methods illustrated by flowcharts 500 of FIG. 5, 600 of FIG. 6, and 1300 of FIG. 13, can be implemented in system 1400. Various embodiments of the invention are described in terms of this example computer system 1400. After reading this description, it will become apparent to a person skilled in the relevant art how to implement the invention using other computer systems and/or computer architectures.

Computer system 1400 includes one or more processors, such as processor 1404. Processor 1404 can be a special purpose or a general purpose processor. Processor 1404 is connected to a communication infrastructure 1406 (for example, a bus or network).

Computer system 1400 also includes a main memory 1408, preferably random access memory (RAM), and may also include a secondary memory 1410. Secondary memory 1410 may include, for example, a hard disk drive 1412, a removable storage drive 1414, and/or a memory stick. Removable storage drive 1414 may comprise a floppy disk drive, a magnetic tape drive, an optical disk drive, a flash memory, or the like. The removable storage drive 1414 reads from and/or writes to a removable storage unit 1418 in a well known manner. Removable storage unit 1418 may comprise a floppy disk, magnetic tape, optical disk, etc. which is read by and written to by removable storage drive 1414. As will be appreciated by persons skilled in the relevant art(s), removable storage unit 1418 includes a computer usable storage medium having stored therein computer software and/or data.

In alternative implementations, secondary memory 1410 may include other similar means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Communications interface 1424 may include a modem, a network interface (such as an Ethernet card), a communications port, a PCMCIA slot and card, or the like. Software and data transferred via communications interface 1424 are in the form of signals which may be electronic, electromagnetic, optical, or other signals capable of being received by communications interface 1424. These signals are provided to communications interface 1424 via a communications path 1426. Communications path 1426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1418, removable storage unit 1422, and a hard disk installed in hard disk drive 1412. Signals carried over communications path 1426 can also embody the logic described herein. Computer program medium and computer usable medium can also refer to memories, such as main memory 1408 and secondary memory 1410, which can be memory semiconductors (e.g. DRAMs, etc.). These computer program products are means for providing software to computer system 1400.

Computer programs (also called computer control logic) are stored in main memory 1408 and/or secondary memory 1410. Computer programs may also be received via communications interface 1424. Such computer programs, when executed, enable computer system 1400 to implement the present invention as discussed herein. In particular, the computer programs, when executed, enable processor 1404 to implement the processes of the present invention, such as the steps in the methods illustrated by flowcharts 500 of FIG. 5, 600 of FIG. 6, and 1300 of FIG. 13, discussed above. Accordingly, such computer programs represent controllers of the computer system 1400. Where the invention is implemented using software, the software may be stored in a computer program product and loaded into computer system 1400 using removable storage drive 1414, interface 1420, hard drive 1412 or communications interface 1424.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

XII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
   parsing an instruction from a client device to obtain a corresponding transaction;
   calling a function on a application interface mapped to the corresponding transaction, wherein the application programming interface provides definitions for a generic set of functions;
   calling a corresponding function on a plug-in via the application programming interface, wherein the plug-in is configured to interface with a transaction system and to associate calls made via the generic set of functions of the application programming interface with corresponding functionality specific to the transaction system configured to implement the generic set of functions;
   receiving a response from the transaction system; and
   transmitting the response to the client device.

2. The method of claim 1, further comprising:
   determining whether authentication is needed to perform the transaction; and
   performing an authentication request to authenticate the client device if authentication is needed.

3. The method of claim 1, further comprising:
   receiving the instruction from the client device on one of one or more channels.

4. A system comprising:
   a memory configured to store modules comprising:
      a parsing module configured to parse an instruction from a client device to obtain a corresponding transaction,
      a service manager module configured to call a function on an application programming interface mapped to the corresponding transaction, wherein the application programming interface provides definitions for a generic set of functions, and configured to call a corresponding function on a plug-in via the application programming interface, wherein the plug-in is configured to interface with a transaction system and to associate calls made via the generic set of functions of the application programming interface with corresponding functionality specific to the transaction system configured to implement the generic set of functions,
      a receiving module configured to receive a response from the transaction system, and
      a transmitting module configured to transmit the response to the client device; and
   one or more processors configured to process the modules.

5. A computer-usable medium having computer program logic recorded, thereon, execution of which, by a computing device, causes the computing device to perform operations comprising:
 parsing an instruction from a client device to obtain a corresponding transaction;
 calling a function on an application programming interface mapped to the corresponding transaction, wherein the application programming interface provides definitions for a generic set of functions;
 calling a corresponding function on a plug-in via the application programming interface, wherein the plug-in is configured to interface with a transaction system and to associate calls made via the generic set of functions of the application programming interface with corresponding functionality specific to the transaction system configured to implement the generic set of functions;
 receiving a response from the transaction system; and
 transmitting the response to the client device.

6. An interface comprising:
 a channel manager configured to establish communications with a client device over one or more channels and to receive information comprising a transaction from the client device;
 an application programming interface that provides definitions for a generic set of functions; and
 a service manager configured to call a function on the application programming interface mapped to the transaction, comprising calling a corresponding function on a plug-in via the application programming interface, wherein the plug-in is configured to interface with the transaction system and to associate calls made via the generic set of functions of the application programming interface with the corresponding function specific to the transaction system configured to implement the generic set of functions.

7. The interface of claim 6, wherein the channels comprise a rich client service channel.

8. The interface of claim 6, wherein the channels comprise an SMS service channel.

9. The interface of claim 6, wherein the channels comprise a WAP service channel.

10. The interface of claim 6, further comprising:
 an implementation of the application programming interface contained within the plug-in, the implementation mapping the transaction to a function on the transaction system.

11. The interface of claim 6, further comprising a device authentication module.

12. The interface of claim 6, further comprising a user authentication module.

13. The interface of claim 6, further comprising an out-of-band authorization module.

14. The interface of claim 6, wherein the client device comprises a cellular phone.

15. The interface of claim 6, wherein the transaction system comprises a banking system.

16. The interface of claim 6, wherein the transaction comprises a banking transaction.

17. The interface of claim 10, wherein the function on the transaction system is accessed through a web page associated with the transaction system.

18. A computer-usable medium having computer program logic recorded thereon, execution of which, by a computing device, causes the computing device to perform operations comprising:
 establishing communications with a client device over one or more channels;
 receiving information comprising a transaction from the client device;
 providing an application programming interface that provides definitions for a generic set of functions; and
 calling a function on the application programming interface mapped to the, transaction, comprising calling a corresponding function on a plug-in via the application programming interface, wherein the plug-in is configured to interface with the transaction system and to associate calls made via the generic set of functions of the application programming interface with the corresponding function on specific to the transaction system configured to implement the generic set of functions.

19. The computer-usable medium of claim 18, wherein the channels comprise a rich client service channel.

20. The computer-usable medium of claim 18, wherein the channels comprise an SMS service channel.

21. The computer-usable medium of claim 18, wherein the channels comprise a WAP service channel.

22. The computer-usable medium of claim 18, the operations further comprising:
 providing an implementation of the application programming interface contained within the plug-in, the implementation mapping the transaction to a function on the transaction system.

23. The computer-usable medium of claim 22, wherein the function on the transaction system is accessed through a web page associated with the transaction system.

24. The computer-usable medium of claim 18, further comprising providing a device authentication challenge.

25. The computer-usable medium of claim 18, further comprising providing a user authentication challenge.

26. The computer-usable medium of claim 18, further comprising providing an out-of-band authorization means.

27. The computer-usable medium of claim 18, wherein the client device is comprises a cellular phone.

28. The computer-usable medium of claim 18, wherein the transaction system comprises a banking system.

29. The computer-usable medium of claim 18, wherein the transaction comprises a banking transaction.

30. A method comprising:
 communicating with a client device over one or more channels;
 receiving information comprising a transaction from the client device over one of the one or more channels;
 providing an application programming interface that provides definitions for a generic set of functions; and
 calling a function on the application programming interface mapped to the transaction, comprising calling a corresponding function on a plug-in via the application programming interface, wherein the plug-in is configured to interface with the transaction system and to associate calls made via the generic set of functions of the application programming interface with the corresponding function specific to the transaction system configured to implement the generic set of functions.

31. A method comprising:
 transmitting an instruction to an interface, wherein the interface is configured to:
 parse the instruction to obtain a corresponding transaction,
 call a function on an application programming interface mapped to the corresponding transaction, wherein the application programming interface provides definitions for a generic set of functions, call a corresponding function on a plug-in via the application programming interface, wherein the plug-in is configured to interface with a transaction system and to associate calls made via the generic set of functions of the application programming interface with corresponding functionality specific to the transaction system configured to implement the generic set of functions, and receive a response from the transaction system; and receiving the response from the interface.

* * * * *